Aug. 24, 1937.  A. A. THOMAS  2,090,768
LIFTING AND/OR SIDEWARD DRIVING MECHANISM FOR AUTOMOBILES
Filed Aug. 2, 1930  7 Sheets-Sheet 1

INVENTOR
Adolph A. Thomas

Aug. 24, 1937.   A. A. THOMAS   2,090,768
LIFTING AND/OR SIDEWARD DRIVING MECHANISM FOR AUTOMOBILES
Filed Aug. 2, 1930   7 Sheets-Sheet 2

INVENTOR
Adolph A. Thomas

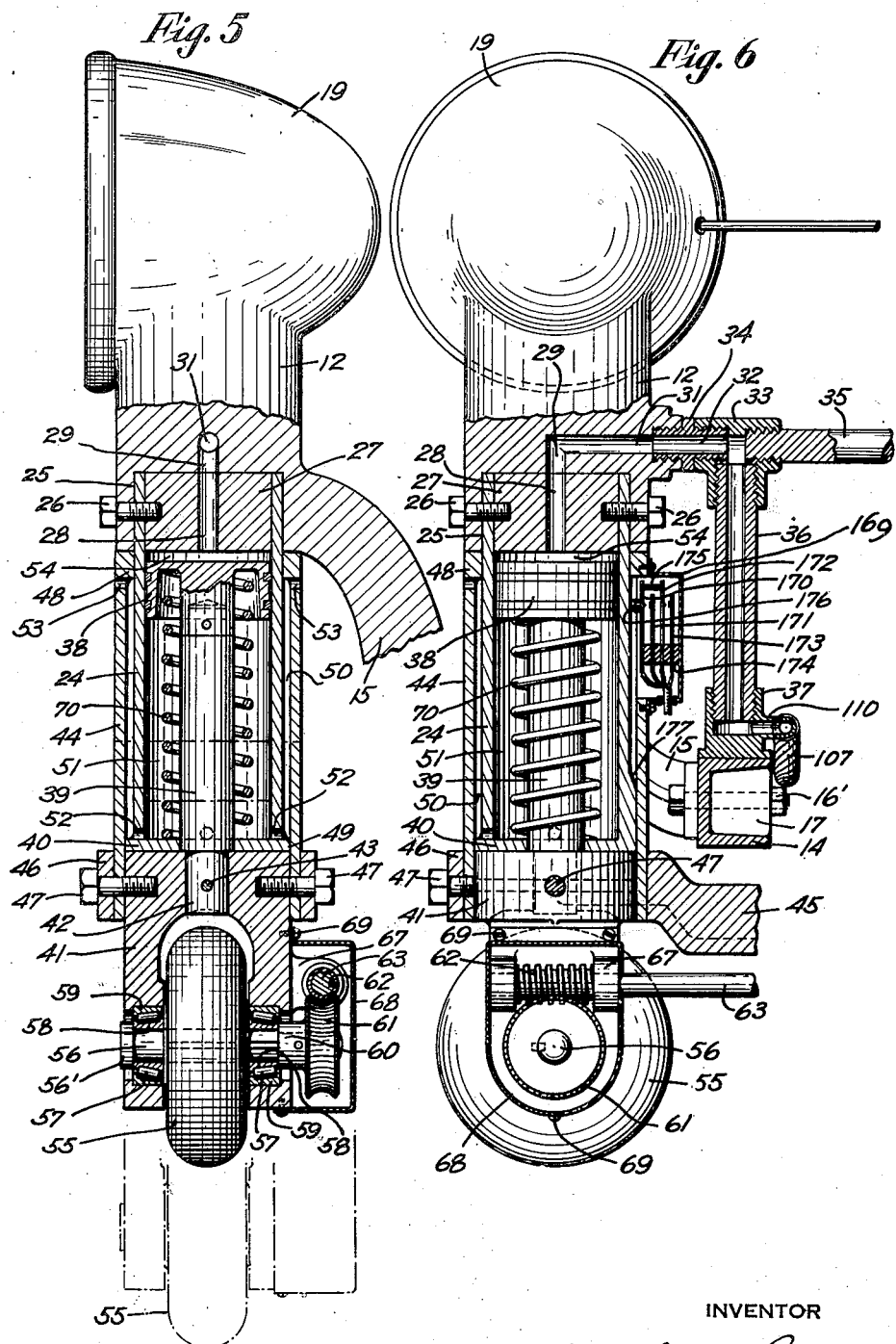

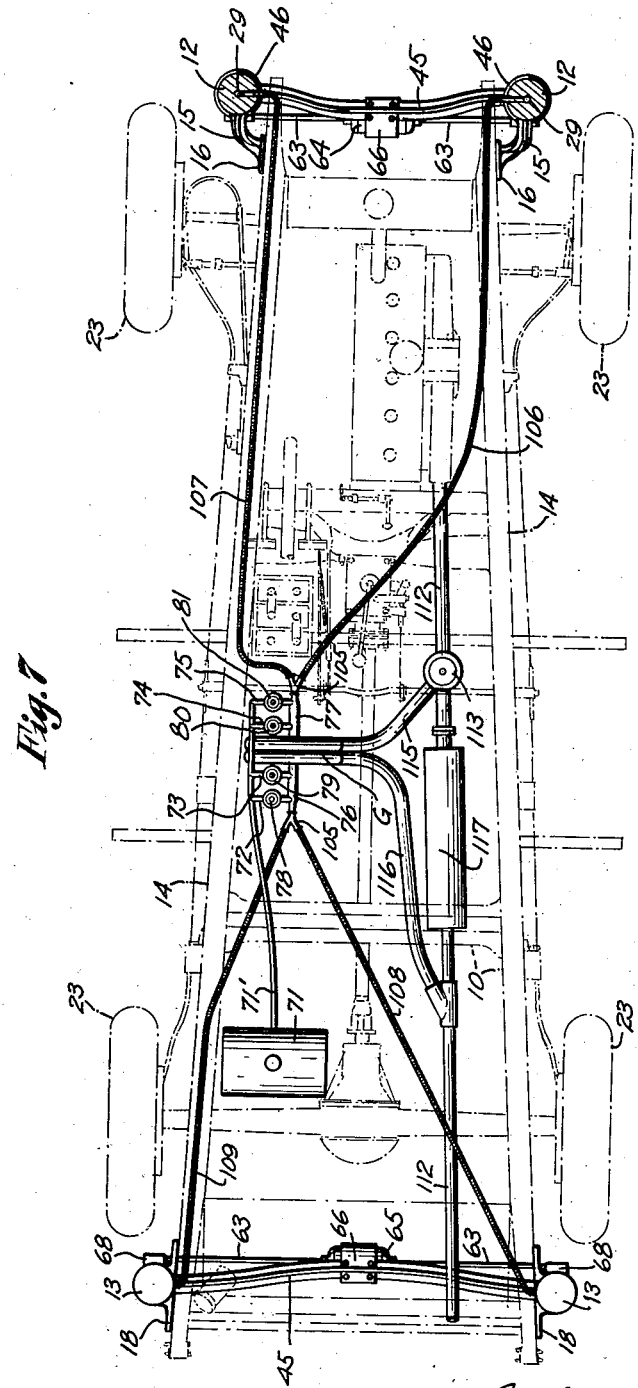

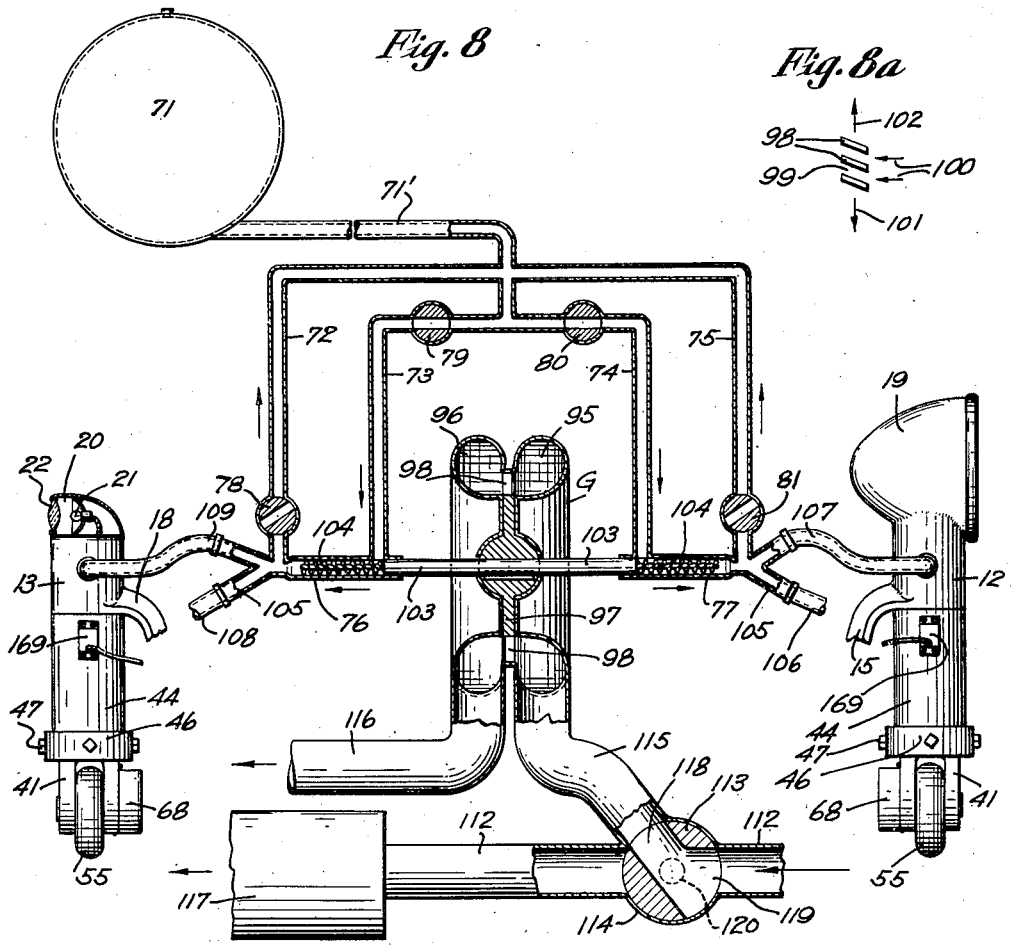

Aug. 24, 1937.  A. A. THOMAS  2,090,768
LIFTING AND/OR SIDEWARD DRIVING MECHANISM FOR AUTOMOBILES
Filed Aug. 2, 1930    7 Sheets-Sheet 6
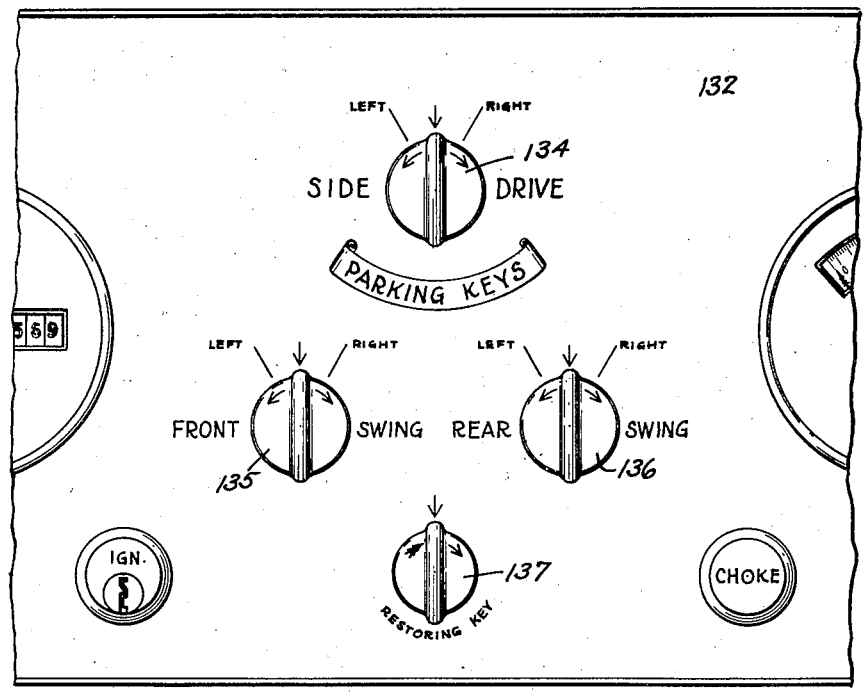
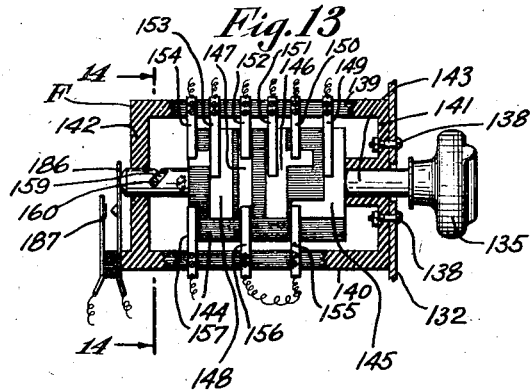
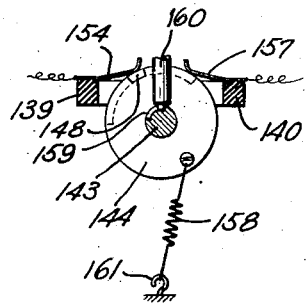
INVENTOR
Adolph A. Thomas

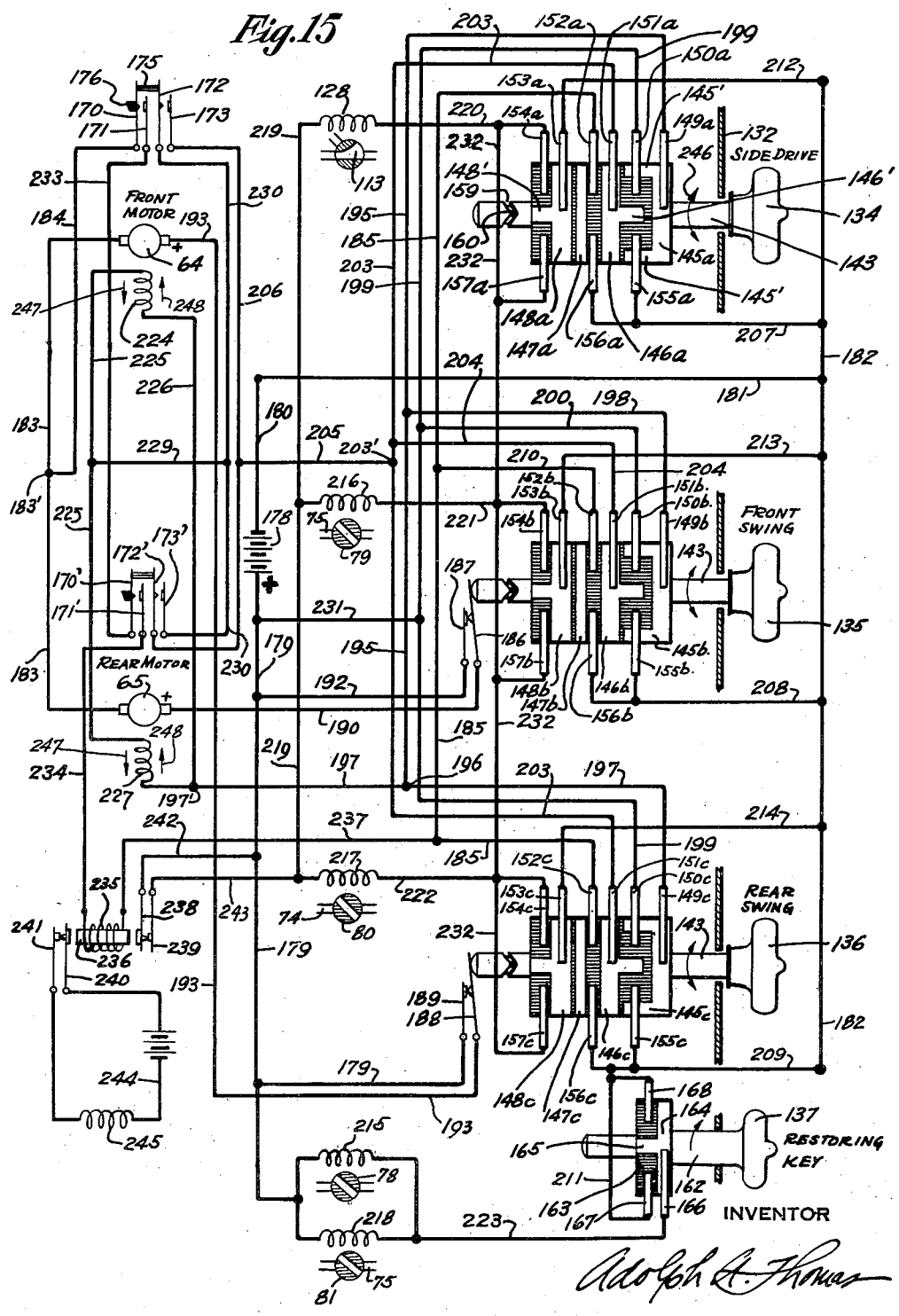

Patented Aug. 24, 1937

2,090,768

UNITED STATES PATENT OFFICE 2,090,768

LIFTING AND/OR SIDEWARD DRIVING MECHANISM FOR AUTOMOBILES

Adolph A. Thomas, New York, N. Y.

Application August 2, 1930, Serial No. 472,631

44 Claims. (Cl. 180—1)

This invention relates to automobiles and its object is to provide practical means for lifting and/or driving a car sideward in either direction. The need of a lateral drive for automobiles has long been recognized, but as far as I know all previous attempts to solve that problem have been impractical. For example, it has been proposed to lift a car on small parking wheels geared to the engine shaft for lateral propulsion of the car. Parking devices of that kind are utterly useless, because the mechanical transmission connections between the engine shaft and the parking wheels are too complicated to be installed on any car.

My novel parking mechanism has no mechanical connection with the automobile engine and is controlled entirely by hand keys or buttons on the instrument panel of the car. One feature of my invention comprises means utilizing the kinetic energy of the exhaust gases from the engine to lift the car and support it on a set of parking wheels. For this purpose I connect a small gas turbine beneath the car with the exhaust manifold of the engine, so that the high-speed gases rotate the turbine wheel very fast. At the four corners of the car I support rigid upright cylinders which are connected with an oil tank mounted on the car at any convenient place. Each cylinder has a vertically movable piston which carries at its lower end a small wheel arranged to rotate transversely of the car. As the turbine wheel spins round under the impulse of the exhaust gases, it pumps oil into the cylinders above the piston, whereby the parking wheels are first lowered to the ground and then the car is gradually lifted off its running wheels. Each pair of parking wheels is geared to a small electric motor, and these motors are automatically set in operation after the car has been raised to drive the parking wheels right or left as desired. The connections between the gas turbine and the hydraulic cylinders are such that a few pounds pressure of the exhaust gases against the turbine blades is sufficient to raise the heaviest car built.

The various operations above described follow automatically upon the mere turn of a key or knob on the instrument panel of the car, so that even a child can drive the car sideways. The control keys are preferably self-restoring and the side movement of the car stops automatically when the operated key is released. The car is supported in raised position by the oil or other fluid pumped into the cylinders, and the turn of a separate key causes the oil to flow out of the cylinders back into the tank, whereby the car sinks to normal position. In a more elaborate embodimet of my invention I also include provisions for swinging either end of the raised car right or left, and these operations are controlled by a pair of extra keys. An automobile equipped with my invention can be driven sideways in either direction as easily as forward or backward, so that it can be quickly moved into and out of parking position, out of a rut or hole in the highway, or wherever a side movement of the car is necessary. Another use of my device is as a jack to hold the car up for changing tires or giving access to parts underneath. The mechanism of my invention is comparatively simple and can be installed on any make of motor car.

The novel features and practical advantages of my invention will be understood from a description of the accompanying drawings, in which—

Figs. 5 and 6 are sectional views of one of the hydraulic cylinders on which the car is raised and moved sideward, these views being at right angles to each other;

Fig. 7 illustrates the parking mechanism in top plan view, the chassis of the car being indicated in dotted outline;

Fig. 8 shows diagrammatically the valve-controlled pipe connections between the hydraulic cylinders and an oil tank, and also the connections leading from the exhaust manifold of the engine to the gas turbine that pumps oil into the cylinders;

Fig. 8a is a diagrammatic plan view of a section of the gas turbine wheel shown in Fig. 8 to illustrate the angular arrangement of the blades against which the exhaust gases impinge;

Fig. 9 shows a solenoid for operating a valve that connects the exhaust manifold of the engine either with the gas turbine or with the muffler of the car;

Fig. 10 is a face view of a solenoid-operated valve in the pipe connections between the oil tank and the cylinders;

Fig. 11 illustrates a side view of Fig. 10 with the valve sectioned for clearness;

Fig. 12 shows a preferred arrangement of the parking keys on the instrument board of the car;

Fig. 13 is a plan view of the switch mechanism operated by a parking key;

Fig. 14 is a rear end view of Fig. 13 along section line 14—14; and

Fig. 15 is a diagram of circuits controlled by the parking keys.

Figure 2:
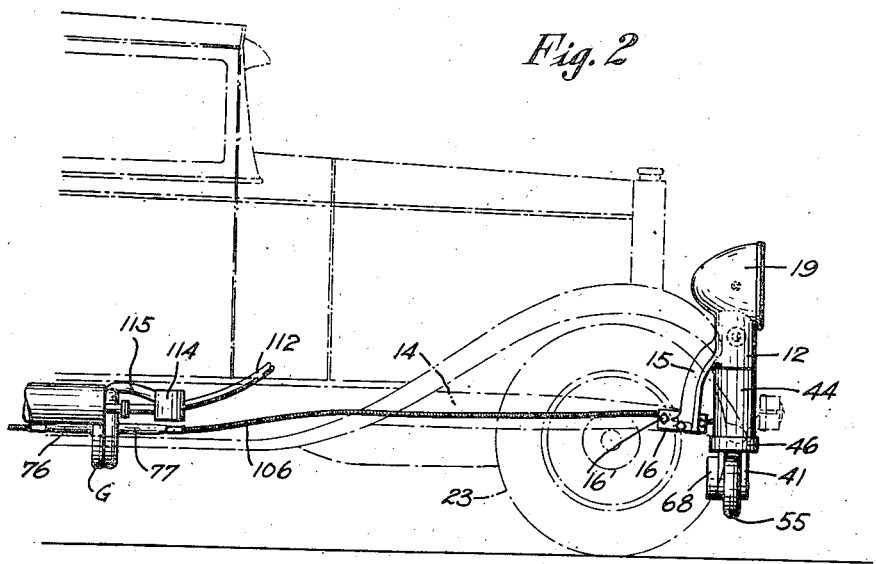
Fig. 2 is a side view of a portion of the parking mechanism in position on a car, the front part of which is indicated in dotted outline.
Figure 3:
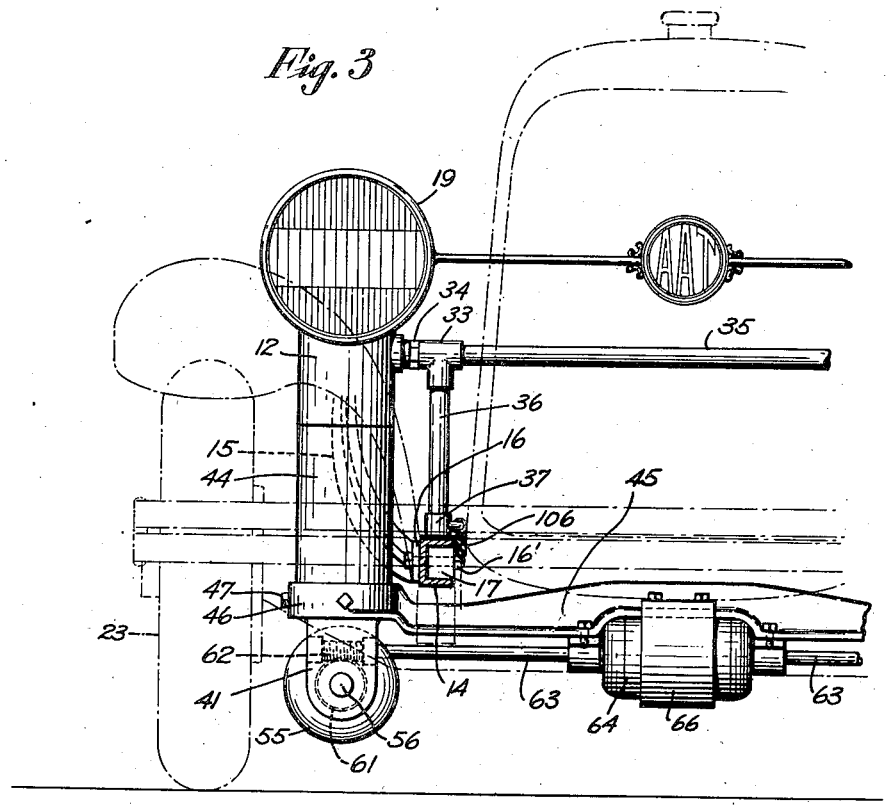
Fig. 3 is a front view of the parking mechanism, which is broken away at the right for lack of space.
Figure 4:
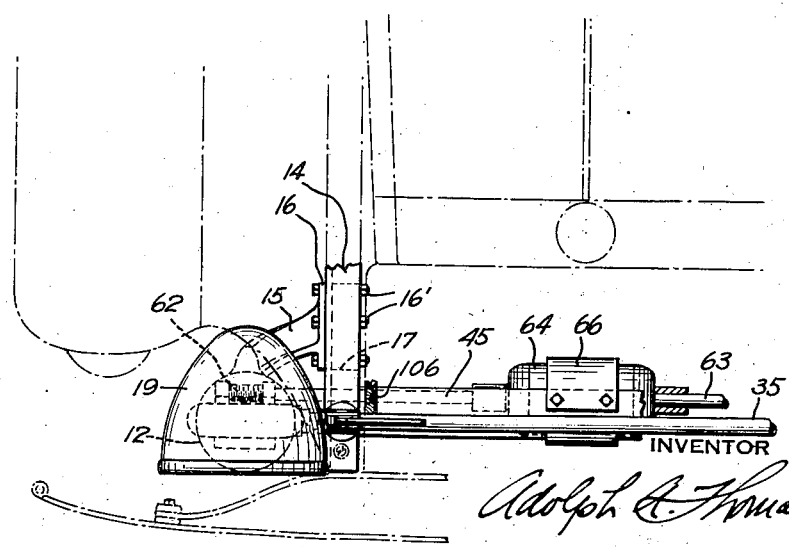
Fig. 4 represents a plan of Fig. 3.

The chassis or framework 10 of an automobile carries two pairs of upright cylinder heads 12 and 13, which may conveniently be secured to the channel bars or rails 14 at each end of the car. The two front cylinder heads 12 are provided with brackets 15 which terminate in flat extensions 16 adapted to fit against the channel bars 14 to which the brackets are secured by bolts 16' or other fastening devices. This will be clear from Figs. 2, 3, and 4. I may use reinforcing blocks 17 fitted snugly in channel bars 14 for receiving the bolt 16', whereby the rigidity of the supporting structure is increased. The rear cylinder heads 13 are provided with brackets 18 which may be secured to the channel rails 14 in the same way as brackets 15 or otherwise. The brackets 15 and 18 may be cast integral with their respective cylinder heads. In the present construction, the front cylinder heads 12 are also utilized to support a pair of head-lights 19, and the outer shell of each head-light may be integral with the cylinder head. The cylinder heads 13 may be formed with a chamber or recess 20 (see Fig. 8) adapted to contain an electric light 21 which shines through a lens or window 22 of appropriate color, such as red.

The four upright cylinder heads 12 and 13 are parts of hydraulic mechanism for lifting the car off its running wheels 23. Since these four cylinder heads and the associated parts are alike in structure, a detailed description of one unit will suffice for all. Referring to Figs. 5 and 6, each cylinder head 12 carries a depending cylinder 24 which fits tightly in a recess 25 of the cylinder head and is secured by screws 26 or otherwise. A collar 27 inserted in the upper end of cylinder 24 receives the fastening screws 26. The bore 28 of collar 27 forms an axial continuation of a central bore 29 in cylinder head 12, and these two bores constitute an oil inlet passage for cylinder 24. Each cylinder head has a lateral passage 31 communicating with the axial bore 29 and adapted to receive a screwthreaded end of a short pipe 32, which is screwed at its other end into a T-joint 33, as best shown in Fig. 6. It should be remarked that Fig. 6 shows a rear sectional view of the left front cylinder head 12 and its associated parts. I mean "left" from the viewpoint of a person in the car. The pipe 32 has a central hexagonal collar 34 which acts like a nut for receiving a monkey wrench or other tool. The two T-joints 33 attached to each pair of cylinder heads are connected by a cross-bar 35, which is not a pipe for carrying oil, but rather a brace or tie adapted to increase the rigidity of the cylinder structure at each end of the car. Each T-joint 33 is connected to the top of a vertical pipe 36, which screws at its lower end into a socket 37 fixed to channel bar 14 in any practical way, as by welding, bolts, rivets, or otherwise. It goes without saying that the joints between socket 37 and passage 31 are fluid-tight, and this applies to each cylinder assembly.

Referring to Figs. 5 and 6, each cylinder 24 contains a piston 38 mounted to operate with an oil-tight fit, as in gas engines. The stem or rod 39 of piston 38 extends through an opening in the bottom plate 40 of cylinder 24, and a block 41 is rigidly secured to the projecting end 42 of the piston rod. The block 41 may be a single casting (as of duralumin) which engages the piston rod in a tight fit and is secured by a cross-pin 43 or by other practical means. The upper portion of block 41 is cylindrical for receiving a cylindrical sleeve 44 which is slidably mounted on cylinder 24. The two slidable sleeves 44 at each end of the car are rigidly connected by a frame 45 which terminates in collars 46 for receiving the lower ends of the sleeves. Bolts or other fastening members 47 secure the block 41 and sleeve 44 to each end of frame 45, so that the connected parts constitute a unitary structure mounted for vertical movement in the associated pair of cylinders 24. The sleeves 44 preferably engage the cylinders 24 with minimum contact area to reduce friction, but without weakening the firm connection between the two parts. For this purpose each sleeve has an annular shoulder 48 at the top adapted to engage the cylinder in a close sliding fit, and the lower end of the cylinder has a similar shoulder 49 which fits snugly in the sleeve. Thus, the annular shoulders 48—49 are the only contact surfaces between the relatively slidable parts 24 and 44, which are separated by a narrow air chamber 50. The space or chamber 51 in each cylinder 24 below the piston 38 is open to the outer air through vents 52 at the bottom of cylinder 24 and vents 53 at the top of sleeve 44. This is necessary for the free movements of the pistons in their respective cylinders. However, the space or chamber 54 above the piston 38 (in any position of the latter) is always cut off from the atmosphere and is in controllable communication with a source of fluid supply, such as an oil tank, through passage 31 and the connected piping. This will be fully explained in due course.

Each block 41 carries a small wheel 55 fixed on a rotary shaft 56, which is journalled in suitable bearings. A good way to support the shaft 56 is on cylindrical rollers 57 arranged divergently at the opposite ends of the shaft (see Fig. 5), whereby the rollers also hold the shaft against axial movement. The rollers 57 are retained between annular bushings 58 and 59, and these assembled units may be obtained in the market. To mount the wheel 55 in its supporting block 41, the bearing units are first inserted from the inside, then the wheel is positioned between the bearings, and then the shaft 56 is passed through the aligned bearings and wheel. The latter is keyed to the shaft, which is held in place by end collars 56' and 60. The collar 56' may be integral with shaft 56. The four extra wheels 55 are arranged to rotate in a direction crosswise of the car, for their function is to move the car sideward, as when getting it into or out of parking position. For this reason I shall refer to wheels 55 as the parking wheels, although they may also be used for merely supporting the car off its running wheels in stationary position. The parking wheels 55 need not be more than about six or eight inches in diameter, and they may have solid rubber rims or be entirely of metal, like duralumin, which is light and strong. One end of each shaft 56 carries a small spiral gear or worm wheel 61 arranged in mesh with a spiral pinion or worm 62 fixed on a transverse shaft 63, which is driven by an electric motor 64 attached to frame 45. That is to say, each pair of parking wheels 55 is geared to the opposite ends of motor shaft 63, and for the sake of distinction I have designated the rear parking motor by the numeral 65. The collar 60 may be an integral hub of worm wheel 61. The electric motors 64—65 are rigidly secured to their respective cross-frames 45 in any practical way, as by a bracket 66 bolted to the frame (see Figs. 3-4). The ends of each driving shaft 63 are mounted in bearings 67 (see Fig. 6) formed on each block 41, and these bearings are preferably enclosed in an oil-tight box or casing 68 which is removably attached to one side of the block by screws 69 or otherwise. In this way, the gear connections between the electric motors 64—65 and the parking wheels 55 are completely hidden and may run in a bath of lubricating oil within the casing. The gear connections 62—61 transmit the high speed of motor shafts 63 to the parking wheels 55 in greatly reduced ratio, so that very little power is needed to move the elevated car slowly in a lateral direction. The electric motors 64—65 should be reversible, for reasons that will be understood as the description proceeds.

It is clear from the preceding paragraph that each cross-frame 45 and all parts connected thereto are supported for vertical movement as a rigid unitary structure, which is slidably mounted on the associated pair of cylinders 24. An expanding coil spring 70 in each cylinder normally holds the piston 38 in uppermost position, so that each frame 45 is yieldably suspended by a pair of springs, which hold the parking wheels 55 off the ground. By making the various parts of each frame structure (except the electric motor) of light strong metal, like an aluminum alloy, the weight normally supported by each pair of coil springs 70 need only be a few pounds. The springs 70 are sufficiently strong to press the blocks 41 against the bottom of cylinder heads 12—13, so that the suspended frames 45 can not rattle when the car is running. If desired, a washer of leather, rubber, or the like, may be interposed between each block 41 and the bottom of the adjacent cylinder 24. Putting the coil springs 70 inside the cylinders 24 is perhaps the simplest and most convenient arrangement for normally holding the side wheels 55 off the ground, but any other practical means may be used for that purpose. It should be noted that the slidable connections between each cross-frame 45 and the associated pair of cylinders 24 remain firm and stable even when the pistons 38 are at the lower end of the cylinders. This is due to the fact that each cylinder 24 is engaged on the inside by piston 38 and on the outside by sleeve 44, and that the piston rod 39 is always in snug contact with the bottom 40 of the cylinder. Consequently, when fluid is forced into the cylinder chambers 54 to push the pistons 38 out and raise the case (as will later be explained in detail), the car is supported on the four parking wheels 55 as securely as on its running wheels.

Figure 1:
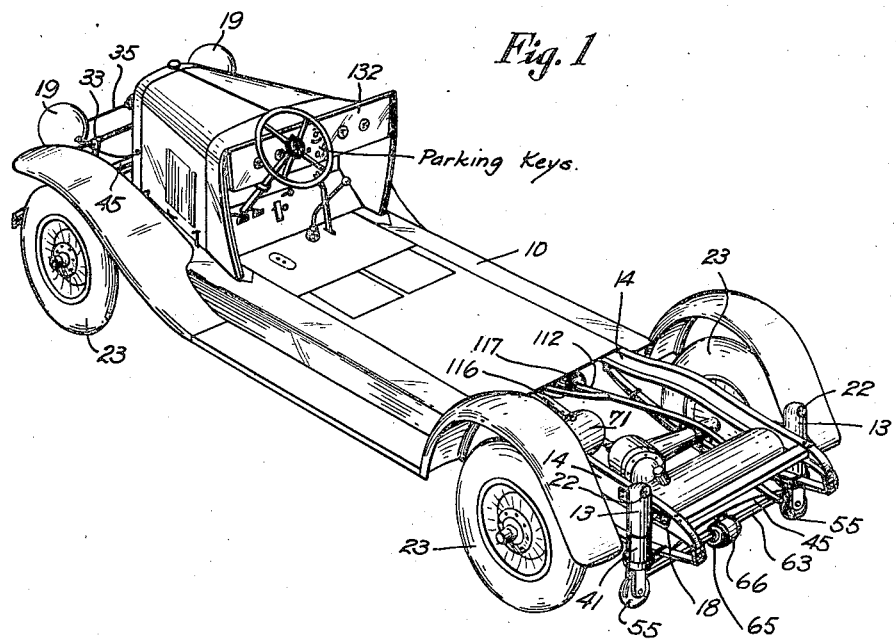
Fig. 1 shows a perspective of an automobile equipped with a preferred embodiment of my new parking mechanism, the body of the car being omitted for clearness.

I shall now describe the connections for pumping oil or other fluid into the upper chambers 54 of cylinders 24 to raise the car on the side wheels 55. An oil tank 71 of sufficient capacity is supported on the car at any convenient point, preferably out of sight. In Figs. 1 and 7, I have shown the tank 71 mounted beneath the body of the car near the rear axle, but any other position will do, depending largely upon the particular design of chassis. In actual practice, the best fluid to use for operating the pistons 38 is probably oil, and so I shall refer to 71 as an oil tank, with the understanding that any other practical kind of incompressible fluid may be employed. A pipe 71' leads from tank 71 to four branch pipes 72, 73, 74, and 75, as shown in Figs. 7 and 8. It should be understood that Fig. 8 is largely diagrammatic, and for that reason the four branch pipes 72-75 are shown spread out in elbow form to promote clearness in the drawings. The two branch pipes 72 and 73 connect with a pipe 76, and the other branch pipes 74 and 75 connect with a pipe 77 which is in axial alignment with pipe 76. The four branch pipes 72-75 contain each a valve 78, 79, 80, and 81 respectively, and these valves may be of any practical construction. For convenience, I have shown each valve as a rotary cylinder 82 (see Fig. 11) mounted in a seat 83 to which the pipes are connected. Each valve cylinder 82 has a passage 84 arranged to move from open to closed position, and vice versa, when the valve is rotated through a predetermined arc, which in this case is only a few degrees. Each valve cylinder 82 has a shaft 85 provided with a crank arm 86 which carries a link 87 by means of a pivot pin 88. The link 87 is connected by a pin 89 to a magnetic core or plunger 90 of a solenoid coil C. A contracting coil spring 91 normally holds the crank arm 86 against a fixed stop 92, and when the coil C is energized it pulls down the plunger 90 until the crank arm strikes another fixed stop 93. The spaced stops 92—93 may conveniently be secured to the cover plate 94 of valve seat 83. Let it be understood that the valve structure shown in Figs. 10—11 is applicable to all four valves 78-71, which normally are held closed by springs 91, and opened when the solenoids are energized. As I shall explain later, the circuits of the valve-operating solenoids are controlled by buttons or keys on the instrument board of the car.

A small gas turbine designated as a whole by G is supported beneath the body of the car between the aligned pipes 76 and 77. In the present instant, the gas turbine G comprises a casing shaped to provide a pair of annular chambers 95 and 96, between which a turbine wheel 97 is mounted for rotation at high speed under the action of the exhaust gases expelled from the cylinders of the automobile engine. The turbine wheel 97 is provided at its periphery with radial blades 98 and the spaces 99 between the blades form the only communication between chambers 95 and 96. The turbine wheel 97 and blades 98 may be a single casting of duralumin or other light strong metal, and the diameter of the wheel need not exceed twelve inches. As shown in Fig. 8a, the turbine blades 98 are arranged at an angle, so that gases striking all the blades simultaneously in the direction of arrows 100 cause the wheel 97 to rotate in the direction of arrow 101. If the gases strike the blades 98 from the opposite direction, the wheel 97 will rotate in the direction of arrow 102. The turbine wheel 97 is keyed to a shaft 103 which projects through the turbine casing into oil pipes 76 and 77, as shown in Fig. 8. The ends of shaft 103 are provided with screw blades or spiral propellers 104 adapted to pump oil from tank 71 through pipes 76 and 77 when the turbine wheel 97 rotates. The spiral propellers 104 may be cast integral with shaft 103 or they may be attached to the ends of the shaft as separate extensions. Since Fig. 8 is mainly diagrammatic, I have not attempted to show any details of the oil-tight connections between turbine shaft 103 and pipes 76—77, for such connections are well known to mechanical engineers. The feed screws or blades 104 are so fitted that they run smoothly with minimum friction in pipes 76—77.

As shown in Figs. 7 and 8, the oil feed pipes 76 and 77 terminate at their outer ends in bifurcations 105 to which four pipes numbered 106 to 109 are connected. These distributing pipes are preferably flexible tubing to facilitate their placement on the chassis, as will be understood from Fig. 7. The function of pipes 106–109 is to distribute oil to the four cylinders 24, and so these pipes are connected to the sockets 37 (see Fig. 6), which are provided with lateral nipples 110 for receiving the flexible pipes in an oil-tight fit. In the diagrammatic view of Fig. 8 I have shown the distributing pipes 107 and 109 connected directly to the lateral passages 31 (see Fig. 6) of cylinder heads 12 and 13, in order to simplify the drawings. This direct connection may also be used in practice, but I think it improves the appearance of the hydraulic cylinder assembly (at least at the front of the car) to have a rigid pipe 36 adjacent each cylinder. Incidentally, the pipes 36 increase the rigidity of the structure. When the two valves 79 and 80 are open, as shown in Fig. 8, the operation of turbine wheel 97 pumps oil simultaneously through all four pipes 106–109 into the upper chambers 54 of cylinders 24, so that the entire car is raised and supported on the four parking wheels 55.

The exhaust pipe 112 of the automobile engine contains a valve 113 which is here shown in the form of a rotary disk or cylinder mounted in a fluid-tight casing 114. A branch pipe 115 leads from valve casing 114 to the annular inlet chamber 95 of the gas turbine. The adjacent outlet chamber 96 is connected by a pipe 116 to the atmosphere either directly or through the exhaust pipe 112, as indicated in Fig. 7. It is clear from that drawing that the exhaust gas turbine G is shunted around the usual muffler 117 of the car, and the function of valve 113 is to send the exhaust gases either directly through the muffler 117 or through the gas turbine G. For this purpose I provide the rotary valve 113 with a passage 118 which has an enlarged end 119. When the valve 113 is in normal position as shown in Fig. 9, it closes the branch pipe 115 and connects the exhaust pipe 112 to muffler 117, so that the exhaust gases pursue their usual course. However, when the valve 113 is moved to the position shown in Fig. 8, the exhaust manifold of the engine is shut off from the muffler and connected to the gas turbine G, which is operated at tremendously high speed by the exhaust gases to pump oil into both pairs of cylinders 24. The turbine-controlling valve 113 is fixed on a rotary shaft 120 which carries at its outer end a crank arm 121, and a pivot pin 122 on the crank arm supports a link 123 which is connected by a pin 124 to a lever 125 pivoted at 126 to a suitable support. The pivoted lever 125 carries a magnetic core or plunger 127 arranged to move into and out of a fixed solenoid coil 128. A contracting coil spring 129 normally holds the lever 125 against a fixed stop 130, so that the passage 118—119 in valve 113 leaves the exhaust pipe 112 open to muffler 117. When the coil 128 is energized, the lever 125 is rocked clockwise (as viewed in Fig. 9) until it strikes a second fixed stop 131. The valve 113 is now in the position shown in Fig. 8 to connect the gas turbine G with the exhaust manifold of the engine. When the circuit of coil 128 is broken, the tensioned spring 129 instantly moves the valve 113 back to normal position. I might explain here that in Fig. 7 I purposely omitted the solenoids that operate the five valves 78–81 and 113, because those parts would have to be shown on a scale too small for clearness.

A person sitting in the driver's seat of an automobile equipped with my invention is able to control the operation of the parking mechanism in every way by merely turning a key or button. Fig. 12 shows a practical arrangement of parking keys mounted on the instrument board 132 of the car. There are four keys numbered 134–137, which in the present embodiment of the invention are turnable to the right or left, except the restoring key 137 which need turn only in one direction. When I speak of the controlling members 134–137 as keys, both in the description and claims, I use that word as a convenient term to designate any practical form of finger piece, whether knob, button, lever, or what not, and irrespective of whether the finger piece is operated by turning, pushing or pulling. The parking keys 134–137 are held in normal position as shown in Fig. 12 by suitable spring means to be presently described. The general operations effected by the parking keys are these (to state them briefly):

When the top key 134 marked "Side drive" is turned either way and held, the valve 113 is moved to the position shown in Fig. 8, and the gas turbine G pumps oil into all four cylinders 24 until the car is raised on the four side wheels 55. The oil-pumping operation is thereupon automatically stopped and the two parking motors 64—65 are simultaneously energized to move the car sideward. If the key 134 is turned to the right, the motors 64—65 propel the car toward the right; and if the key is turned left, the motors move the car toward the left. It may be assumed that the directions right and left are in this instance from the viewpoint of a person in the driver's seat. The car is propelled right or left (as the case may be) on the parking wheels 55 as long as the key 134 is held in turned position. To stop the car, the operator lets go of the key, but that does not lower the car on its running wheels. To do that, the operator turns the bottom key 137 marked "Restoring key", which opens the return valves 78 and 81, while the other two valves 79—80 stay closed. By referring to Fig. 8, it will be seen that the cylinders 24 are now in communication with return pipes 72 and 75, through which the oil is forced out of the cylinders back into the supply tank 71. No pumping action is necessary for the emptying of cylinder chambers 54, because the weight of the descending car forces the oil out of the cylinders until the car stands on its running wheels. Then the tensioned coil springs 70 move the pistons 38 upward and thereby force the oil back through pipes 72–75, until the pistons reach their normal uppermost position, as shown in Figs. 5–6. The operator is supposed to hold the actuated key 137 until the parking wheels 55 are back to raised position. This operation requires only a few seconds.

When the key 135 marked "Front swing" is turned either way and held, the valves 79 and 80 are opened and the valve 113 is moved to the position shown in Fig. 8, as when the key 134 was actuated. The gas turbine G now pumps oil into all four cylinders 24 until the car is raised to the limit, whereupon the front electric motor 64 is automatically energized and drives the two front wheels 55 right or left, depending upon which way the key 135 was turned. The rear motor 65 remains idle. When key 136 is operated, the car is raised as before, but this time it is only the rear motor that runs, so that the car is swung at the rear end to the right or left. The release of key 135 or 136 stops the side swing of the car, which remains in raised position until the restoring key 137 is turned. The "side drive" key 134 is used to move into and out of parking position parallel with the curb. The "rear swing" key 136 will mostly be used to swing the rear end of the car into parking position when the car has stopped at an angle to the curb, as is usual when driving from the middle of the street toward either side. When the driver of a parked car wants to get out of parking position, he may turn the top key 134 to move away from the curb parallel with the street, but he may also use key 135 to swing the front end of the car right or left (as required) clear of the car ahead, or he may use key 136 for a rear swing of the car when he wants to back out from the curb. If the car to be unparked is so closely hemmed in by cars in front and behind that there is no room for swinging either end, it is still possible to get out of parking position by turning the "side drive" key 134. In other words, an automobile equipped with my invention needs only an inch or two more than its own length for parking space. This explains the practical advantages of my new parking automobile in the traffic-jammed streets of large cities.

Each parking key 134, 135 and 136 operates certain switch mechanism which I shall now describe. Since these mechanisms are structurally alike, a description of one will do for all. We may assume that Fig. 13 shows the switch mechanism for key 135. A rectangular frame indicated as a whole by F is mounted on the back side of panel 132 by bolts 138, and this frame may be a single casting of light metal or preferably insulating material such as bakelite, hard rubber, fiber, porcelain, or other moldable composition sufficiently strong. The switch frame F comprises a pair of side bars 139 and 140 connected to two cross pieces 141 and 142 in which a shaft 143 is mounted for combined rotary and axial movement. The finger piece 135 is fixed to the outer end of shaft 143 which carries a cylinder 144 preferably of molded insulating material, and this cylinder carries four contact pieces 145, 146, 147, and 148. These contact pieces may be stamped strips of brass permanently embedded in the molded cylinder, and their different shapes are best shown in Fig. 15. The side bar 139 of insulated frame F carries six contact fingers marked consecutively from 149 to 154, and the other side bar 140 carries three contact fingers 155, 156, and 157. The nine contact fingers 149-157 may be strips of spring brass arranged to press at their ends against the switch cylinder 144. A contracting coil spring 158 normally holds each cylinder 144 (and therefore each parking key 134—136) in neutral position, as shown in Fig. 15. Each switch shaft 143 is provided with a V-shaped groove or slot 159 in which engages the pointed end of a fixed pin 160.

When the parking keys 134—136 are in normal position, the pin 160 is held by spring 158 in the apex of the V-shaped cam slot 159, as seen in Fig. 15. This action of spring 158 may be accentuated by so mounting it that its line of pull is toward the rear of shaft 143. Therefore, when a parking key is turned either way, the cam device 159—160 causes a forward axial movement of shaft 143 until the pin 160 strikes one end end of groove 159. Figs. 13—14 show the position of shaft 143 and the parts mounted therein after the parking key has been turned. The rotation of keys 134-136 is only through a small angle and the axial movement of shaft 143 is so slight as to be hardly perceptible by the operator. When an actuated parking key is released, the tensioned spring 158 instantly returns the parts to normal position. The cam pin 160, as well as the hook 161 to which one end of spring 158 is attached, may be mounted on frame F, so that each parking key and its associated switch mechanism can be secured as an assembled unit to the back side of the instrument panel 132. The parking keys, of course, are attached to the projecting ends of their respective shafts after the units have been mounted in place.

The restoring key 137 requires no axial movement, so it is mounted on a rotary shaft 162 (see Fig. 15) which may be supported in any practical way behind the panel 132, as by a frame or bracket similar to frame F. The shaft 162 carries an insulated cylinder 163 which is provided with a contact piece 164 of brass or other good conducting metal. The contact piece 164 has a lateral extension 165 at the center, and three switch fingers 166, 167 and 168 are arranged to engage the cylinder 163 and its contact piece 164. The switch fingers 166-168 may be strips of spring brass mounted on an insulated frame like the fingers 149-157 in Fig. 13. Suitable spring means, such as a tensioned coil spring like spring 158 in Fig. 14, normally holds the key shaft 162 in the position shown in Fig. 15. That is to say, the lateral contact extension 165 is normally midway of switch fingers 167—168, while the finger 166 is always in engagement with contact 164. When the key 137 is turned either way, one of the switch fingers 167-168 engages the contact extension 165, so that the switch finger 166 is electrically connected to either of the other fingers. Suitable stop means positively limits the rotary movement of key 137 to the required amount. It is not necessary that the restoring key 137 shall be turnable both ways, for it is sufficient that it turn one way, say clockwise. In that case, the switch finger 167 is not needed.

I have stated that, after the car has been lifted up on the parking wheels 55 by the pumping of oil into cylinder chambers 54, the electric motors 64—65 (either or both of them) are automatically energized to actuate the parking wheels. This automatic closing of the motor circuits is accomplished by means of switch mechanism mounted on a slidable sleeve 44 at the front and rear of the car. Referring to Fig. 6, the sleeve 44 carries a small box or casing 169 in which four insulated switch blades 170 to 173 are mounted. The casings 169 are preferably arranged on the inner side of sleeves 44 to make them less conspicuous, as shown in Fig. 8. A simple way to support the switch blades 170-173 is by inserting their lower ends tightly into spaced slots in an insulating block 174 secured inside the box. The switch blades 170-173 are preferably strips or fingers of spring metal, and are normally held by inherent tension out of contact with each other. The switch members 171 and 173 may be rigid contact buttons, but it is probably cheaper to use four spring blades. The two spring blades 170 and 172 are connected by an insulating piece 175, and the inner blade 170 carries an insulating button 176 arranged to project through an opening in sleeve 44 across the space 50 into contact with cylinder 24. The end of button 176 may be bevelled and is adapted to engage a cam shoulder 177 near the lower end of cylinder 24. The normal distance between button 176 and cam shoulder 177 is so calculated that those parts engage when the car has been lifted the required height. When the cam shoulder 177 pushes the button 176 outward, the connected spring blades 170 and 172 are simultaneously forced against the adjacent contacts 171 and 173, respectively, to close the circuits of motors 64 and 65 (or either one of them). Consequently, the raised car is now propelled laterally on wheels 55 in the desired direction, and this sideward movement follows automatically the lifting operation of the parking mechanism. In other words, when a person turns one of the parking keys 134–136, the car is first lifted and then moves sideward until the key is released. This parking control is so simple that even a child can do it.

We are now ready to take up the electric circuit connections in Fig. 15. To facilitate the tracing of circuits, I have differentiated the nine switch fingers 149–157 associated with parking keys 134–136 by the suffix letters a, b, and c. For the same reason, the four switch blades 170–173 carried by one of the rear sleeves 44 are distinguished by prime marks from the corresponding switch blades on one of the front sleeves. A storage battery 178, or other source of current carried by the car, is connected at its terminals to a pair of main conductors 179 and 180. For convenience we may assume that conductor 179 is the positive lead. I might explain here that, when I speak of wires in describing the circuits, I mean broadly any suitable form of electric conductor, whether a wire, plate, bar, spring blade, and the like. The negative battery lead 180 is connected by wire 181 to a conductor 182. The armature windings of motors 64 and 65 are connected at the negative side to a conductor 183, from which a wire 184 leads to switch contact 170. A conductor 185 connects the switch contact 152a of parking key 134 and the corresponding contact 152c of parking key 136. The axial movements of shafts 143 of parking keys 135 and 136 control each a switch comprising a pair of contact members 186—187 for key 135 and a similar pair of contact members 188—189 for key 136. The switch members 186 and 188 are spring arms normally held by shafts 143 in pressure engagement with the associated contacts 187 and 189 respectively. The switch members 187 and 189 may be spring arms, like the movable members 186 and 188, or they may be stationary contact buttons. Each pair of switch members 186—187 and 188—189 may be mounted on the insulating frame F, as shown in Fig. 13. When the key 135 or 136 is turned, the forward axial movement of shaft 143 allows the spring arm 186 or 188 to move away from the associated contact 187 or 189 and open the switch, for a purpose that will presently become clear. The inherent set or tension of spring blades 186 and 188 is such that when unrestrained they are out of engagement with the associated contacts 187 and 189.

Still referring to Fig. 15, the movable switch arm 186 is connected by wire 190 to the positive terminal of the armature winding of motor 65. The switch contact 187 is connected by wire 192 to battery lead 179, which goes to switch contact 189. The associated switch arm 188 is connected by wire 193 to the positive terminal of the armature winding of motor 64. A conductor 195 is connected at one end to switch arm 149a, and at 196 to a conductor 197, which is connected at one end to switch arm 149c. The corresponding switch arm 149b of key 135 is connected to conductor 195 by wire 198. A conductor 199 is connected at its ends to switch arms 150a and 150c, and the corresponding switch arm 150b is connected to the same conductor by wire 200, so that these three switch members are connected in parallel. A conductor 203 is connected at its ends to switch members 151a and 151c, and the corresponding switch member 151b is connected to conductor 203 by wire 204. In other words, the three switch members 151a, 151b and 151c are connected in parallel to conductor 203, which is connected by wire 205 to conductor 206. The ends of conductor 206 are connected to switch members 173 and 172' of the two motor-controlling switches operated by sleeves 44, as previously explained. The three pairs of switch arms 155—156 (differentiated by the suffix letters a, b and c for the parking keys 134, 135 or 136) are connected in parallel to the common conductor 182 by wires 207, 208, and 209 respectively. The switch arm 152b is connected to conductor 185 by wire 210, and a wire 211 connects the switch members 167—168 of restoring key 137 to wire 209. The three switch arms 153 (a, b, c) are connected in parallel to conductor 182 by wires 212, 213 and 214 respectively.

In the description of Fig. 8 I stated that the four valves 78–81 were each operated by a solenoid, and in Figs. 10—11 this solenoid comprises a coil C. In the circuit diagram of Fig. 15, these four solenoids are represented by coils 215 to 218 for valves 78 to 81 respectively, and the solenoid for operating valve 113 is indicated by coil 128. The three solenoid coils 128 and 216—217 are connected at one side in parallel to a common conductor 219, and the other terminals of those coils are connected to wires 220, 221, and 222, which lead to switch fingers 154a, 154b and 154c respectively. The solenoid coils 215 and 218 for valves 78 and 81 are connected in parallel between battery lead 179 and wire 223, which leads to switch member 166. The shunt field winding 224 of the front motor 64 is connected to wires 225 and 226, to which the shunt field winding 227 of the rear motor 65 is also connected. The wire 226 goes to wire 197, and the wire 225 is connected by wire 229 to a conductor 230 which leads to switch members 172 and 173'. The positive lead 179 is connected to conductor 199 by wire 231, and the three parallel wires 220, 221, and 222 are connected to a common conductor 232. A wire 233 connects switch contacts 170' and 171, so that the two switches 170—171 and 170'—171' are connected in series and no current is consumed by the parking motors 64—65 until the car is raised to its full height at both ends.

The switch contact 171' is connected by wire 234 to one side of a coil 235, which is wound on a magnetic core 236, and the other side of coil 235 is connected by wire 237 to conductor 185. It is thus clear that switches 170—171 and 170'—171' and the relay coil 235 are connected in series between conductors 183 and 185, and coil 235 is energized as soon as the parking motors 64—65 start to operate. The parts 235—236 constitute an electromagnetic relay for controlling a pair of switches 238—239 and 240—241. The switch members 238 and 240 may be movable spring arms of magnetic metal or otherwise provided with an armature arranged to be attracted to core 236 when coil 235 is energized. The other switch members 239 and 241 may be spring blades or simply stationary contacts normally engaged by the movable arms 238 and 240. A wire 242 connects the switch arm 238 to battery lead 179, and the associated switch contact 239 is connected by wire 243 to conductor 219. The normally closed switch 240—241 is in the ignition system 244, which I have indicated for convenience as a simple battery circuit operating an ignition coil 245. When the relay coil 235 is energized, the two switches 238—239 and 240—241 are simultaneously opened to break the circuit of solenoid coils 128, 216, and 217, and to stop the operation of the engine. The de-energizing of coils 128, 216, and 217 allows the valves 113, 79, and 80 to move to normal closed position, so that the gas turbine G stops and the oil in cylinder chambers 54 is prevented from returning to tank 71. In other words, during the operation of motors 64—65, the car is safely supported on four columns of oil. The operation of gas turbine G stops when valve 113 is moved to normal position and disconnects the inlet chamber 95 from exhaust pipe 112, so that the switch 240—241 is really not necessary. It may be used, however, to stop the engine and thereby save fuel during the lateral movement of the car.

In the normal position of keys 134—137, all electric circuits are open, due to the relative arrangement of the fixed and movable contact members in the switch mechanism controlled by each key. This is clear by looking at Fig. 15. Let us suppose that key 134 is turned to the right (i. e., in the direction of arrow head 246). The key stops when the lateral extensions 146' and 148' on contact pieces 146a and 148a engage the brushes or fingers 150a and 154a respectively. At the same time, the finger 155a engages the lateral extension 145' at one end of the U-shaped contact piece 145a. The axial forward movement of shaft 143 shifts the contact strip 147a into engagement with fingers 152a and 156a. The adjusted position of switch cylinder 144 is shown in Fig. 13, which applies to any one of the keys 134, 135, and 136. The turning of the "side drive" key 134 to the right simultaneously energizes the solenoid coils 128, 216, and 217 which operate the associated valves 113, 79, and 80. The energizing circuits are closed through these connections: from battery lead 179 (assumed to be the positive terminal), wire 242, closed switch 238—239, wire 243 to conductor 219, through coils 128, 216, and 217 in parallel to the common conductor 232, across the switch arms 154a—153a which are closed by contact 148a, wire 212, conductor 182, and through wire 181 to the return lead 180. The energizing of coil 128 operates valve 113 to connect the inlet turbine pipe 115 with exhaust pipe 112, and the energized coils 216 and 217 open the associated valves 79 and 80, as shown in Fig. 8. Consequently, the high-speed gases from the exhaust manifold of the engine rotate the turbine wheel 97 very fast, and the spiral screws or propellers 104 pump oil simultaneously into all four cylinders 24, as previously explained. The first effect of the oil entering the cylinder chambers 54 is to push down the pistons 38 against the lifting tension of springs 76, until the parking wheels 55 touch the ground. As the oil continues to flow into the hydraulic cylinders, the pistons 38 remain stationary and the cylinders 24 are pushed up, so that the entire car slowly rises while supported on wheels 55.

The elevation of the car without side movement continues until the switches carried by two of the sleeves 44 are closed by the cam shoulder 177 actuating the button 176 (Fig. 6), whereupon the electric motors 64 and 65 are simultaneously energized to rotate the four parking wheels 55 toward the right at the same speed. The motor circuits are closed in this way: from the positive battery lead 179 across the closed switch 189—188, wire 193, through the armature winding of the front motor 64, wire 183 to point 183', wire 184, across the closed switch 170—171, through wire 233 across the closed switch 170'—171', wire 234, coil 235, wire 237, conductor 185, across the closed switch 152a—156a, and through wires 207—182—181 to the return lead 180. The circuit through the armature winding of the rear parking motor 65 is completed through battery lead 179, wire 192, across the closed switch 187—186, wire 190, through the armature of the motor, wire 183 to point 183', and from there through the connections just traced for the armature winding of motor 64. It is seen from this that the armature windings of the two parking motors are connected in parallel, but any other practical circuit arrangement for the motors may be employed. The electric current flow through the armature coils is always in the same direction, and the direction of rotation of the motor shafts depends upon the direction of current flow through the shunt field windings 224 and 227. In Fig. 15 it has been assumed that when the current flows through the field coils of each motor in the direction of arrow 247, the motor propels the car toward the driver's right; and when the current flows the other way, as indicated by arrow 248, the car moves to the left. In the present operation we turned the parking key 134 to the right, and the current through the motor field windings causes operation of the motors in the desired direction. The circuit through field windings 224 and 227 goes from battery lead 179, wire 231, conductor 199, across switch arms 150a—151a which are now connected by contact 146a, conductor 203 to point 203', wires 205 and 206, through closed switches 172—173 and 172'—173' in parallel, wires 230—229—225, through both field windings 224 and 227 in parallel in the direction of arrow 247, wires 226 and 197 to point 196, conductor 195, switch arms 149a and 155a now closed by contact 145a, and through wires 207—182—181 to return lead 180.

The simultaneous energization of motors 64—65 causes them to propel the raised car sideways (to the right in this instance) on parking wheels 55 until the operator releases the key 134. This opens all circuits and the car stops, but it remains supported in raised position on wheels 55, because the valves 79, 80, and 113 were automatically closed when relay coil 235 was energized simultaneously with the starting of motors 64—65, as already explained. To lower the car, the operator turns the restoring key 137 which closes a switch to energize the solenoid coils 215 and 218 and thereby opens the return valves 78 and 81. The circuit of coils 215 and 218 is closed from battery lead 179, through the two coils in parallel, wire 223, switch finger 166 which is now connected through contact 164 with either of the associated switch members 167—168, and through the connected wiring 211—209—182—181 to the return main 180. The energized coils 215 and 218 open the valves 78 and 81 which allow the oil in cylinders 24 to return to the supply tank 71, as previously explained. It goes without saying that the oil tank 71 is provided with the usual air inlet and outlet valves to permit the free flow of oil out of and into the tank. The operator is supposed to hold key 137 until the parking wheels 55 are in normal withdrawn position, but this interval of time is only a matter of seconds. When the key 134 is turned to the left, the circuits are closed as above described, except that the current flows through the motor field coils in the direction of arrow 248 to cause lateral movement of the car toward the left. The field circuit may now be traced from positive lead 179, wire 231, conductor 199, across switch members 150a—149a which are now closed by contact 145a, conductor 195 to point 196, wire 197 to point 197', through both field windings 224 and 227 in the direction of arrow 248, through wires 225 and 229 to conductor 230, through the closed switches 172—173 and 172'—173' in parallel, wire 205, conductor 203, through the connected switch contacts 151a—146a—155a, and through wires 207—182—181 to the return main 180.

The operation of "front swing" key 135 first lifts the car on the side wheels 55 and then swings the front of the car right or left, depending upon which way the key was turned. When the "rear swing" key 136 is turned, the raised car is swung sideways at the rear end. These front and rear swings are accomplished by cutting out the rear motor 65 when key 135 is operated, and cutting out the front motor 64 when key 136 is used. These operations are, of course, automatic and require no attention by the operator who need only turn the key in the direction in which the car should swing. When key 135 or 136 is operated in either direction, the solenoid coils 128, 216, and 217 are energized to connect valve 113 with the gas turbine and open valves 79—80, and these energizing circuits are the same as previously traced for key 134, except that now I use the switch mechanism controlled by key 135 or 136. In other words, the operation of lifting the car on parking wheels 55 is the same whether key 134, 135 or 136 is used. However, whereas key 134 starts and stops both motors 64 and 65 simultaneously, key 135 energizes only the front motor 64 and key 136 energizes only the rear motor 65. When the "front swing" key 135 is turned either way, the shaft 143 moves forward and opens the switch 186—187 in the armature circuit of motor 65, which therefore remains inoperative as long as the key is held in actuated position. The front motor 64, however, is energized through the same circuit connections that were described for key 134, except that now I use the switch contacts associated with key 135. When the "rear swing" key 136 is turned right or left, the switch 188—189 is opened, so that no current flows through the armature of motor 64 and the latter remains idle. The rear motor 65, however, is energized to turn the rear parking wheels 55 and swing the car right or left at the rear end until the key is released. Swinging only one end of the car naturally puts a lateral strain on the two wheels 55 at the other end, but the wheels are built and mounted to withstand that strain. Besides, the "side drive" key 134 will probably be used most of the time for getting alongside of the curb and away from it.

The exhaust gas turbine G is a small compact device which is cheap to make and easy to install beneath the car. By utilizing the exhaust gases of the engine to actuate the turbine wheel 97, I am able to dispense with all mechanical connections between the engine shaft and the oil-pumping shaft 103. While the mass of the exhaust gases entering the annular turbine chamber 95 is very small, their velocity is tremendously high, being about 10,000 ft. per second. Since the kinetic energy of a moving body is proportional to the product of its mass and the square of the velocity, the exhaust gases strike the turbine blades 98 with sufficient force to rotate the wheel 97 at several thousand revolutions per minute. The pressure of the gases as they strike the turbine blades may be anywhere from a fraction of a pound at low engine speed to five pounds or more at high speed. This pressure will obviously vary in engines of different design and horsepower, and the particular dimensions of turbine wheel 97 will be so calculated that the exhaust gases are capable of actuating the wheel to pump oil into cylinders 24. There is a tremendous amplification of power between turbine shaft 103 and cylinders 24, and this amplification is brought about by a combination of the principles of the screw and the hydraulic press. True, the amount of oil fed forward through the connecting pipes into cylinder chambers 54 during each revolution of turbine wheel 97 is very small, but the high speed of the turbine wheel makes it possible to lift the car in less than a minute. It should be noted that the oil pressure is automatically equalized in the four cylinder chambers 54 at the end of the lifting operation. The various parts of this hydraulic mechanism are so designed and dimensioned that the small force with which the exhaust gases strike the turbine wheel is capable of pumping oil into cylinder chambers 54 to lift the heaviest car on the market. The operation of gas turbine G affords a sufficiently free flow of the exhaust gases to prevent clogging of the engine cylinders. In fact, the turbine may be so constructed that it offers about the same resistance to the exhaust gases as the muffler 117.

To illustrate the great mechanical advantages procured between the prime mover 97 and the hydraulic cylinders 24, let us assume that the area of each piston chamber 54 is to the area of inlet passage 28 as 120:1. This ratio obtains when, for instance, the diameter of chamber 54 is 5.5 inches (area 23.75 sq. in.) and the diameter of inlet 28 is 0.5 inch (area 0.2 sq. in.). I am using merely approximate figures. Consequently, a pressure of 1 lb. in oil inlet 28 supports a total pressure (or weight) of 120 lbs. in chamber 54. If we have a car with a maximum weight of 6,000 lbs. (i. e. when filled with passengers), each piston 38 supports 1500 lbs. when the car is raised. This means that the oil pressure (or total downward push) in each inlet 28 need only be $$\frac{1500}{120}$$

or 12.5 lbs. It is supposed that the area of the pipe connections from the forked branches 105 of the main feed pipes 76—77 to each cylinder inlet 28 is substantially uniform and equal to the area of the inlet. The inside area of each pipe 76—77 will therefore be (theoretically at least) equal to the combined area of the two inlet passages 28 with which that pipe connects.

Therefore, the pressure necessary in each pipe 76—77 to feed the oil through the connected piping 106—107 and 108—109 is about 25 lbs., leaving out losses by friction. Well, let us say that in an actual mechanism it takes a pressure of 30 lbs. in each pipe 76—77 to lift a car of 6,000 lbs., as above assumed. The next thing to find out is how great a force is required to operate the pump shaft 103. If the feed screws 104 have a pitch of 0.25 inch, and if the diameter of turbine wheel 97 is 6 inches (giving an effective leverage of 3 inches), the effort to move a load of 30 lbs. is found by the formula:

$$E \text{ (moving force)} = \frac{\text{load} \times \text{pitch of screw}}{2\pi \times \text{length of lever}}$$

Substituting the above values in this formula we get E equals less than 0.5, which means that it takes a pressure of about half a pound to operate the turbine wheel 97. I have already stated that the exhaust gases strike the turbine blades 98 at a pressure greater than one pound, so there is ample power in these otherwise useless gases to do the useful work of lifting even the heaviest automobile made for the trade. The rate at which the car is raised depends upon the rate at which the oil is fed into the inlet passages 28, and the rate of feeding (with a given diameter of pipes) depends upon the pitch of feed screws 104 and the speed of turbine wheel 97. It is hardly necessary to add that the above figures are merely illustrative and are not to be interpreted as a limitation or restriction of my invention.

The self-restoring keys 134 to 137 may be replaced by rotary and slidable finger pieces adapted to remain in actuated position, so that a person can take his hand away until the car has moved to the desired position. One advantage of a self-restoring key or button is that it can never be left in circuit-closing position by accident. By connecting the two switches 170—171 and 170'—171' in series, the parking motors 64—65 are not energized until both ends of the automobile are fully raised. Furthermore, this arrangement of switches insures simultaneous starting and stopping of the motors when key 134 is operated. The automatic stopping of gas turbine G when the car reaches the limit of its upward movement, either by stopping the engine or moving the valve 113 to normal position, prevents possible injury to the engine and the hydraulic mechanism, besides the saving of fuel. In some instances the gas turbine G may be replaced by an electric motor, which would require very little power to operate the oil-pumping shaft 103 for reasons already explained. When it is desired only to raise the car, as for inspection or changing a tire, the operator releases the actuated key just as the car starts to move sideways. The fact that no other manual operation than the turning of a key or pushing of a button is necessary to lift the car and move it sideways, adds greatly to the practicability of my invention. There is plenty of room on the instrument board of any car for the installation of the parking keys. In a simplified form of my invention, either the "side drive" key 134 or the two side-swing keys 135—136 and all connected mechanism may be omitted, because in either case the car can be moved laterally to any desired position.

Although I have shown and described a specific construction, I want it understood that my invention is not limited to the details set forth. In embodying my parking mechanism for commercial use, engineers will doubtless decide on changes here and there in adapting the invention to cars of different sizes and designs. The basic features of my invention may be mechanically exemplified in other forms than herein set forth without departing from the scope of the invention as defined in the appended claims. Also, not all the various features herein set forth need be embodied in the same apparatus. For example, in a simplified form, my invention may be used as an hydraulic power jack mounted on an automobile to lift either end off its running wheels, as for changing a tire. In that case, the parking wheels and their associated mechanisms are omitted. When I speak of an automobile in the description and claims I mean any type of self-propelled vehicle, whether a passenger car, bus, truck, and the like. I might add that the drawings have not been made to manufacturing scale and the relative dimensions of some parts have been purposely exaggerated for clearness.

I claim as my invention:

1. An automobile provided with means utilizing the kinetic energy of the exhaust gases of the engine for raising the car, and means whereby the car is supported in raised position independently of said gases.

2. An automobile provided with hydraulic mechanism operated by the kinetic energy of the exhaust gases of the engine for raising the car, and means whereby the car is supported in raised position independently of said gases.

3. An automobile provided at each end with mechanism for raising that end off its running wheels and swinging the raised end sideward, said two mechanisms being unconnected with the crankshaft of the automobile engine, and means for selectively controlling either mechanism independently of the other, whereby the car may be raised and swung sideward at either end alone.

4. An automobile provided with mechanism for raising it off at least one pair of its running wheels, means operated independently of the automobile engine for propelling the raised end of the car sideward in either direction, a single adjustable finger piece, and connections whereby the operation of said finger piece controls said mechanism to lift the car and also controls said means to propel the raised end of the car sideward in the desired direction, said connections including electromagnetic means.

5. An automobile provided with hydraulic mechanism for raising the car, a source of liquid supply for said mechanism, a turbine wheel rotated at high speed by the exhaust gases of the engine for pumping liquid into said mechanism to raise the car, and means for trapping the liquid in said mechanism to support the car in raised position.

6. An automobile provided with mechanism utilizing the kinetic energy of the exhaust gases of the engine for raising the car, said mechanism including means for supporting the car in raised position, and means independent of the engine for driving the raised car sideward.

7. An automobile provided with hydraulic mechanism for raising the car and supporting it in raised position, a turbine wheel rotated at high speed by the exhaust gases of the engine for operating said mechanism, and means for automatically stopping said turbine wheel when the car is raised.

8. An automobile provided with mechanism for raising it off at least one pair of wheels and propelling the raised car sideward, and a single adjustable fingerpiece for controlling both of said operations in automatic sequence, said mechanism including a rotary sideward driving wheel mounted on a vertically adjustable axis controlled by said finger piece for moving the wheel down to and off the ground.

9. An automobile provided on its instrument panel with a key adapted to be moved manually in opposite direction, and mechanism automatically controlled by said key for propelling the car sideward in either direction, the direction of this sideward movement depending upon the direction in which said key is operated.

10. An automobile provided with parking mechanism having four wheels for propelling the car sideward in either direction, an adjustable finger piece for operating said mechanism to propel the car sideward on all four wheels, and a second adjustable finger piece for operating said mechanism to swing the car sideward on one pair of said wheels.

11. An automobile having two pairs of extra wheels arranged to move the car sideward in either direction, said wheels being normally above ground, means for raising the car and supporting it on said wheels, means for actuating said wheels, and manually controlled connections for operating said raising means and actuating means in automatic sequence.

12. An automobile provided with at least one extra wheel adapted to swing one end of the car sideward, mechanism for raising the car on said wheel and supporting it in raised position, other mechanism for actuating said wheel in either direction, and means whereby said other mechanism is automatically set in operation when the car is raised to predetermined position.

13. An automobile provided with hydraulic mechanism operated by the kinetic energy of the exhaust gases of the engine for raising the car, said mechanism including two pairs of wheels for supporting the car in raised position, said wheels being arranged to move the car sideward, and an electric motor connected to each pair of wheels for operating the same.

14. An automobile provided with at least two extra wheels adapted to move the car sideward, mechanism for raising the car on said wheels and supporting it in raised position, other mechanism for actuating said wheels in either direction, a rotary finger piece mounted within reach of the driver, and connections whereby the turning of said finger piece in either direction automatically causes said first mechanism to raise the car and causes said other mechanism to actuate said wheels for moving the car sideward in the same direction in which the finger piece was turned.

15. An automobile provided at one end with a pair of vertical cylinders, a piston movable in each cylinder and carrying at its lower end a wheel arranged to rotate transversely of the car in either direction, a source of fluid supply connected with said cylinders, a turbine wheel operated by the exhaust gases of the automobile engine for pumping fluid from said source into said cylinders to raise the car and support it on said wheels, and means for actuating said wheels in either direction to move the raised car sideward.

16. An automobile provided at each end with a pair of vertical cylinders rigidly supported, a piston operable in each cylinder for supporting the car in raised position, a tank of fluid supply, a pair of axially aligned pipes connected with said tank, a pair of branch pipes leading from one end of each of said aligned pipes to a pair of said cylinders, a prime mover having a shaft extending at its ends into said aligned pipes, means on the ends of said shaft for forcing fluid from said tank simultaneously into all cylinders when said prime mover rotates, whereby the car is supported on said piston, and manually operable means for controlling said prime mover.

17. An automobile provided at one end with a pair of vertical cylinders rigidly supported, a piston movable in each cylinder and carrying at its lower end a wheel arranged to rotate transversely of the car in either direction, a vertically movable frame secured to said pistons, an electric motor carried by said frame and connected to said wheels for actuating the same in either direction, means for forcing fluid into said cylinders to raise the car and support it on said wheels, a switch automatically controlled by the relative movement of said cylinders and pistons for closing the motor circuit when the car is in raised position, whereby the raised car is moved sideward on said wheels, and manually operable means for controlling the direction of movement of said wheels.

18. An automobile provided with hydraulic lifting mechanism, a rotary device operated by the kinetic energy of the exhaust gases of the automobile engine for pumping liquid into said mechanism, and means for supporting the car in raised position when said device stops.

19. An automobile provided with hydraulic lifting mechanism, a rotary device operated by the kinetic energy of the exhaust gases of the automobile engine for pumping liquid into said mechanism, and a controllable valve for locking the pumped liquid in said mechanism to support the car in raised position when said device stops.

20. An automobile provided with mechanism for raising at least one end of the car off the running wheels and propelling the raised car sideward, said mechanism including electric driving means for the sideward movement of the car, and manually operable means for controlling both of said operations in such a way that the second operation follows the first in automatic sequence, said means also controlling the direction of the sideward movement.

21. An automobile provided with means for raising at least one end of the car off the running wheels, said means being mechanically disconnected from the engine shaft, an electric motor for propelling the raised end of the car sideward, a single adjustable finger piece, and connections controlled by the movements of said finger piece for controlling said means and motor, said connections including electric switch mechanism actuated by said finger piece.

22. An automobile provided with apparatus for raising an end of the car and propelling the raised end sideward in either direction, said apparatus being mechanically disconnected from the shaft of the automobile engine, and a single hand-operable member for controlling said apparatus to perform said raising and sideward operations in automatic sequence.

23. An automobile provided with mechanism for raising at least one end of the car off the running wheels, an electric motor for operating said mechanism to move the raised car sideward, a single hand-operable member for controlling both of said operations in automatic sequence, and connections whereby the direction of rotation of said motor depends upon the direction of movement of said member.

24. An automobile provided on its instrument panel with a key adapted to be manually turned in either direction, mechanism automatically controlled by said key for propelling the car sideward in either direction, the direction of this sideward movement depending upon the direction in which said key is turned, and means whereby the release of said key automatically stops the side movement of the car.

25. An automobile provided with parking mechanism adapted to raise both ends of the car and support the same in raised position, said mechanism including means for moving the raised car sideward, and hand-operable means for so controlling said mechanism that the raised car can be moved sideward at both ends simultaneously or at either end alone, said hand-operable means also controlling the direction of said sideward movements.

26. An automobile provided with parking mechanism adapted to raise both ends of the car and support the same in raised position, said mechanism including means for moving the raised car sideward, a hand-operable member for controlling said mechanism to swing only the front end of the car sideward in either direction, and a second hand-operable member for controlling said mechanism to swing only the rear end of the car sideward in either direction.

27. An automobile provided with mechanism for moving it sideward, said mechanism including a pair of extra wheels at the front end of the car and a second pair of extra wheels at the rear end to support the car for sideward movement, a finger piece operatively connected with said mechanism for driving only the front pair of said wheels in either direction, and a second finger piece for controlling said mechanism to drive only the rear pair of said wheels in either direction.

28. An automobile provided with parking mechanism adapted to raise both ends of the car and support the same in raised position, said mechanism including means for moving the raised car sideward, a hand-operable member for controlling said mechanism to swing only the front end of the car sideward in either direction, a second hand-operable member for controlling said mechanism to swing only the rear end of the car sideward in either direction, and a third hand-operable member for controlling said mechanism to move both ends of the raised car sideward.

29. An automobile provided with hydraulic mechanism for raising at least one end of the car, said mechanism including at least one cylinder and a piston movable therein, means for pumping liquid into said cylinder, and means for trapping said liquid in the cylinder to form a sealed liquid column for firmly supporting the car in raised position, said trapping means being automatically operable upon the stopping of said pumping means.

30. An automobile provided with hydraulic mechanism for raising at least one end of the car off the running wheels, said mechanism including at least one cylinder and a piston movable therein, means for preventing exhaust gases of the automobile engine from entering said cylinder, means for pumping liquid into said cylinder, a valve for controlling the flow of liquid, and electro-magnetic means automatically energized when the car is raised a predetermined distance to close said valve and thereby trap the liquid in said cylinder to form a sealed liquid column on which the car is supported in raised position.

31. An automobile provided at one end with a pair of vertical fixed cylinders having each a piston movable therein, mechanism for operating said pistons, a vertically movable frame for connecting said pistons so that they operate as a unit, at least one parking wheel carried by said frame for propelling the car sideward, an electric motor mounted on said frame between said pistons and operatively connected to said parking wheel, and a single hand-operable member for controlling said mechanism and motor.

32. An automobile provided with hydraulic mechanism for raising the car and supporting it in raised position, and a turbine wheel rotated at high speed by the exhaust gases of the engine for operating said mechanism, said wheel having a set of blades which are all exposed at the same time to the kinetic energy of the entering gases, whereby the low pressure of the gases is capable of driving said wheel with sufficient power.

33. An automobile provided with at least one extra wheel adapted to move the car sideward, mechanism for raising the car on said wheel and supporting it in raised position, an electric motor connected to said wheel, the circuit of said motor being normally open, and means for automatically closing the motor circuit when the car is supported on said wheel.

34. An automobile provided with parking mechanism for raising at least one end of the car off the running wheels, said mechanism including a vertically movable member which carries a parking wheel, an electric motor for operating said parking wheel to move the raised car sideward, a switch automatically operated when said member is at the end of its outward movement to energize said motor, and means for controlling the direction of operation of said motor.

35. An automobile provided with parking mechanism for raising at least one end of the car off the running wheels, said mechanism including an hydraulic cylinder having a vertically movable piston, a parking wheel connected to said piston, an electric motor for operating said parking wheel to move the raised car sideward, a switch automatically operated when the piston is at the end of its outward movement to energize said motor, and means for controlling the direction of operation of the motor.

36. An automobile carrying at one end a vertically movable structure adapted to raise that end of the car, said structure carrying at least one parking wheel to propel the raised car sideward, a controllable source of power for moving said structure downward to raise the car, an electric motor carried by said structure for operating said parking wheel, said motor being normally de-energized, means whereby said motor is automatically energized when said structure reaches the end of its downward movement, and means for controlling the direction of operation of said motor.

37. An automobile carrying at one end a vertically movable structure adapted to raise that end of the car, said structure carrying at least one parking wheel to propel the raised car sideward, a controllable source of power for moving said structure downward to raise the car, a separate source of power for operating said parking wheel, said second source of power being normally inoperative, means whereby the second source of power is automatically rendered operative when said structure reaches the end of its downward movement, and means for controlling the direction of rotation of said parking wheel.

38. An automobile carrying at one end a vertically movable structure adapted to raise that end of the car, said structure carrying at least one parking wheel to propel the raised car sideward, a source of power for moving said structure downward to raise the car, a manually operable member for rendering said source of power active, means whereby said source of power is automatically rendered inactive when said structure reaches a predetermined position in raising the car, and a separate source of power for operating said parking wheel to propel the raised car sideward in either direction, both of said sources of power being mechanically independent of the engine shaft.

39. An automobile provided at each end with a pair of vertical cylinders rigidly supported, a piston operable in each cylinder and carrying a wheel, said wheels being arranged to rotate transversely of the car to move the same sideward, a tank of fluid supply, a pair of axially aligned pipes connected with said tank, a pair of branch pipes leading from one end of each of said aligned pipes to a pair of said cylinders, a gas turbine adapted to be connected to the exhaust manifold of the automobile engine, said gas turbine including a wheel mounted on a shaft which extends at its ends into said aligned pipes, the ends of said turbine shaft having means for forcing fluid from said tank simultaneously into all cylinders when the turbine wheel rotates, whereby the raised car is supported on said wheels, mechanism independent of said gas turbine for actuating said wheels to propel the car sideward in either direction, and manually operable means for controlling said turbine and mechanism.

40. An automobile provided with fluid-operated lifting mechanism, and a device operated by the kinetic energy of the exhaust gases of the automobile engine for pumping fluid other than said exhaust gases into said mechanism, said fluid supporting the car in raised position.

41. An automobile carrying hydraulic jack mechanism which comprises a fixed cylinder attached to the car and provided with an extension at one end, an oil passage connecting the cylinder with said extension, said oil passage being parallel with the axis of the cylinder, a bore in said extension substantially at right angles to said oil passage and communicating with the latter, an oil pipe connected with said bore, an oil reservoir carried by the automobile and connected with said pipe, a reciprocable piston arranged in the cylinder, a vertically movable ground-engaging member connected with said piston, a coil spring in said cylinder for normally retracting the piston and holding said member in raised position, a prime mover carried by the automobile for pumping oil from the reservoir into the cylinder through said bore and passage, whereby the piston is forced outward against the tension of said coil spring to lower said member into contact with the ground and raise the car, said prime mover being mechanically disconnected from the engine shaft of the car, and means for holding the pumped oil in the cylinder to support the raised end of the car, said means being releasable to allow return of the oil from the cylinder to the reservoir by the automatic retracting action of said coil spring, whereby said member is raised to normal position and the car is lowered on its running wheels.

42. An automobile carrying hydraulic jack mechanism which comprises a fixed cylinder attached to the car and provided with an extension at one end, an oil passage between said extension and the cylinder, said oil passage being parallel with the axis of the cylinder, a wall of said extension having a bore communicating with said oil passage, an oil pipe connected with said bore, an oil reservoir carried by the automobile and connected with said pipe, a piston reciprocable in the cylinder, a vertically movable ground-engaging member connected with said piston, a coil spring in said cylinder for normally retracting the piston and holding said member in raised position, said piston comprising a hollow cylindrical part into which the coil spring extends, the diameter of the spring being only slightly less than the inner diameter of said hollow cylindrical part, a prime mover carried by the automobile for pumping oil from the reservoir into the cylinder through said bore and passage, whereby the piston is forced outward against the tension of said coil spring to lower said member into contact with the ground and raise the car, said prime mover being mechanically disconnected from the engine shaft of the car, and means for holding the pumped oil in the cylinder to support the raised end of the car, said means being releasable to allow return of the oil from the cylinder to the reservoir by the automatic retracting action of said coil spring, whereby said member is raised to normal position and the car is lowered on its running wheels.

43. An automobile having fluid-pressure producing means, a pipe connected with said means for conducting the fluid pressure therethrough, a two-way valve connected with said pipe, two branch pipes connected with said valve, a pump connected with one of said branch pipes and operated by the fluid pressure passing through the connected branch pipe, means connected with the other branch pipe for receiving the fluid pressure conducted through said other branch pipe, hydraulic jack mechanism carried by the car and operated by said pump, and means for selectively adjusting said valve to connect either branch pipe alone with said fluid-pressure producing means, said pump being inoperative when said other branch pipe is connected with the fluid-pressure producing means.

44. An automobile carrying a pair of hydraulic jacks at the front and a second pair of hydraulic jacks at the rear, a pipe connection between each pair of jacks, each pipe connection being always open to maintain permanent communication between the hydraulic cylinders of the associated pair of jacks, an oil feed pipe leading to each of said pipe connections, whereby oil forced through each feed pipe always enters both of the associated pipe connections for simultaneously operating the connected pair of jacks, a valve for selectively controlling each feed pipe so that either pair of jacks may be operated to the exclusion of the other or both pairs of jacks may be simultaneously operated, there being thus but one oil feed valve for each pair of jacks which are operable in pairs only, an oil reservoir on the vehicle, and means on the vehicle for pumping oil through said valve-controlled feed pipes, said pumping means being mechanically disconnected from the engine shaft of the car.

ADOLPH A. THOMAS.